Feb. 25, 1969   Q. A. HANSEN   3,429,410
CLUTCH WITH NON-ROTATABLE FLUID MOTOR
Filed Oct. 31, 1967
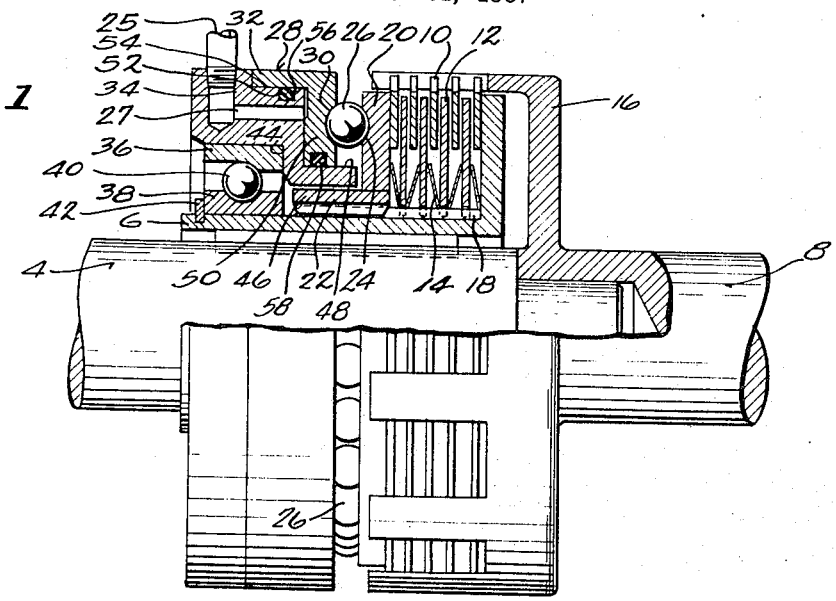
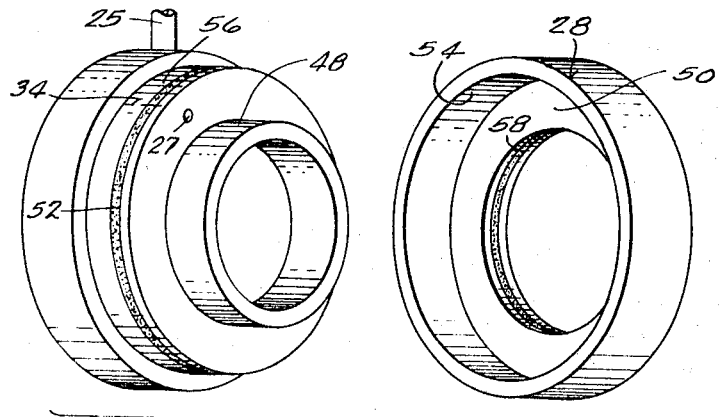
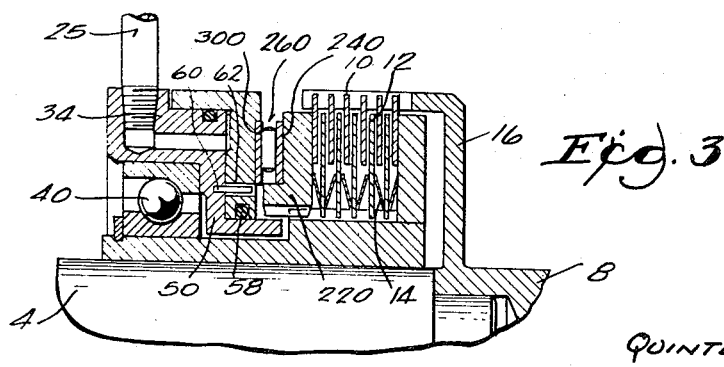
INVENTOR
QUINTEN A. HANSEN
BY Wheeler, Wheeler, House & Clemency
ATTORNEYS

United States Patent Office 3,429,410
Patented Feb. 25, 1969

3,429,410
CLUTCH WITH NON-ROTATABLE FLUID MOTOR
Quinten A. Hansen, 4338 Hy 38,
Franksville, Wis. 53126
Filed Oct. 31, 1967, Ser. No. 679,465
U.S. Cl. 192—85    5 Claims
Int. Cl. F16d 25/00, 19/00, 13/60

ABSTRACT OF THE DISCLOSURE

Clutch disks, whereof at least one is connected to a rotor, are normally spring disengaged and can be engaged by axial thrust of a cylinder which is telescopically extensible from a fixed piston. As shown, the fixed piston has a bearing on the said rotor and the axially extensible cylinder has a thrust bearing between it and a clutch pressure plate which is splined to the rotor.

Background of the invention

As is well-known, alternating plates engageable as a clutch may be called a clutch when the plates are both connected with respective rotors. The same plates will function as a brake if one of the plates is fixed and only the other plate is mounted on the rotor. Hence, the device herein disclosed will always function as a clutch, regardless of whether it connects a rotor with a fixed part or with a second rotor.

For the prior art, reference is made to the disclosure of my prior Patents 3,038,575 and 3,011,608, and references cited thereon. For more recent patents see: 3,253,-687, 3,305,054, 3,250,353, 3,048,248, 3,045,790, 3,065,-832, 3,104,000, 2,887,202, 3,011,609.

As compared with these patents and with commercial clutches, the instant clutch advantageously combines compactness and strength, giving greater thrust, and torque capacity and greater life.

Summary of the invention

The fluid pressure operator comprises a piston element and a cylindrical element. The piston element is fixed against movement and provides communication between the fluid pressure supply line and the interior of the cylinder element which moves axially of the piston element in response to such pressure. A combination ball radial and thrust bearing has angular-contact inner and outer races and serves as the main support for the piston and cylinder assembly, the inner race being disposed on a mounting sleeve against a shoulder carried thereby while the outer race is disposed within a seat provided interiorly by the annular piston of the operator.

The axial thrust bearing is preferably a ball bearing although a needle bearing may be used as shown in a second embodiment.

The pressure plate of the clutch is splined to the mounting sleeve for axial movement thereon and constitutes a race for the balls of the axial ball thrust bearing for which the cylinder element of the operator constitutes the other race. The hub of the pressure plate is reciprocable within a tubular extension of the piston element of the operator. An O-ring or other packing is provided between this tubular extension and the cylinder element of the operator, such cylinder element also having an O-ring or other appropriate packing between it and the piston element of the operator.

Brief description of drawings

FIG. 1 is a view partially in side elevation and partially in axial section through a preferred embodiment of the invention.

FIG. 2 is a view in perspective showing the piston and cylinder elements of the operator as they appear in mutually separated positions.

FIG. 3 is a view similar to FIG. 1 showing a modified embodiment.

Description of preferred disclosure

The device will be described as a clutch, for the sole reason that the preferred embodiment shows the plates engageable to connect a rotor element with a second element which is also a rotor. If the second element were stationary, the plates would still function as a clutch but the device would be a specific form of clutch which is known as a brake.

For the purposes hereof, the first rotor element comprises a shaft 4 to which is keyed the mounting sleeve 6 for the clutch. The second rotor element may comprise a gear as shown in Patent 3,011,608. However, for the purposes of the present disclosure, any rotor may be used such as the illustrated shaft 8 in which the shaft 4 is piloted.

The alternating clutch plates 10 and 12 normally spaced by interposed springs 14 as in Patent 3,011,608, are respectively connected with the bell portion 16 of the driven shaft 8 and with splines 18 on sleeve 6. For engaging the clutch, the clutch disks 10 and 12 are pushed into frictional engagement by the pressure or follower plate 20 by the thrust of the operator now to be described.

The follower plate 20 is splined to the sleeve 6 and axially reciprocable along the sleeve. Its hub portion 22 has considerable axial length so that the plate will move with accuracy throughout its range of operation. One reason why this is desirable is because the plate has an annular channel at 24 enabling it to function as a race for a thrust bearing which comprises balls 26. The opposite race is provided by the axially reciprocable cylinder 28 of the fluid opeator, this having a similar annular channel 30 for the balls 26. Fluid is admitted to the operator through the inlet pipe 25 and communicated through the duct 27 directly to the cylinder. As an optional feature of advantage, it is possible to prefabricate separately the pressure plate or back plate 20 and to attach this to the hub 22 by copper brazing or the like. By so doing, I can provide plate 20 with improved axial rigidity.

The cylinder 28 has a sleeve portion 32 telescopically reciprocable on the outer peripheray of the piston element 34, which is fixed to a combination radial and thrust bearing including an outer race 36. An inner race 38 and balls 40 are interposed between the annular piston 34 and the sleeve 6. The inner race 38 seats against a snap ring 42 which provides a shoulder at the end of the sleeve 6. The outer race 36 has a seat against a shoulder 44 provided in the annular piston 34. The shoulder is formed by the connection to the piston 34 of the tubular piston extension 46. This extension may encircle the hub 22 of the follower plate 20. It has a finished external wall at 48 along which the end wall portion 50 of cylinder 28 is reciprocable. O-ring packing is preferably provided at 52 between the internal peripher 54 of the cylinder wall 32 and the external periphery 56 of the stationary piston 34. Similar O-ring packing may be used at 58 between the internal periphery of end wall 50 and the external periphery 48 of the piston extension 46. The thickness of the end wall 50 of the cylinder can be relatively nominal because the fluid pressures within the cylinder act directly against the thrust balls 26, thus minimizing the need for strength. The inner seal 58 fits readily within the space available as required by the ball race 30.

Obviously, the resulting structure is extremely compact despite the fact that it uses anti-friction balls for bearing purposes to provide the strength which is required for some services.

The invention is not limited to the use of anti-friction ball bearings. FIG. 3 shows a structure closely comparable to that above described with the exception that needle bearings 260 have been substituted for the balls 26. These use races 240 and 300.

In the FIG. 3 construction, the hub portion 220 of the follower is much shorter than hub 22 in the preferred FIG. 1 construction, and the piston extension telescopes into the hub 220 instead of encircling the hub as in the construction of FIG. 1. This extends the cylinder chamber into the space between bearings, providing a larger clutch hub bore with increased potential actuating pressures and longer bearingf life and greater thrust capacity. Otherwise the construction of FIG. 1 is preferred to ensure that the follower or pressure plate of the clutch will remain normal to the main hub 6.

It is important to maintain the pressure plate normal to the axis even while the clutch is under full engagement thrust. Otherwise the plate would yield into parallelism with the pack of clutch disks. These are not normally perfectly flat and may assume an out of square relation. If this occurs, the bearings of the clutch operator run out of parallel, causing axial wobble between the cylinder and the piston. This may cause erratic action, as well as seal wear and breakdown.

With the construction shown in FIG. 1, there is a tendency for clutch disks which may be uneven to rectify themselves in use as the result of wearing off of high spots. In any case, the operation is preferable to a construction which creates a wobble in the operator.

Both embodiments of the invention are believed to have greater torque ratings and bearing life and bore size than previous clutch designs, still remaining within the same over-all dimensions both axial and radial. In addition, the preferred FIG. 1 construction incorporates ball bearings throughout, this being regarded as a very substantial advantage, particularly in the field of machine tool usage.

When the ball bearings are used as in FIG. 1, these will normally be self-lubricating since the races are fully exposed. When the needle bearings are used as in FIG. 3, some accessory source of lubrication is desirable. I may provide an anchor pin 60 extending through a very slightly larger opening 62 into the cylinder 50 of the FIG. 3 construction. Such a pin performs the dual functions of holding the cylinder 50 against rotation while, at the same time, the opening bleeds into the bearings 260 for the lubrication thereof a minute quantity of the hydraulic operating liquid used to engage the clutch. So small an opening might become plugged but for the relative movement between the pin and the sides of the opening.

I claim:

1. A clutch comprising a first rotor including a main hub having a portion of lesser radius and a portion of greater radius, a second rotor having a portion encircling the portion of greater radius of the first rotor hub, a first series of disks splined to the encircling portion of the second rotor, a second series of disks interleaved with the disks of the first series and splined to the greater radius portion of the main hub, stop means on the main hub and abutted by one of said disks, spring means interposed between successive disks of the second series and serving to urge said last mentioned disks apart, a pressure plate for compressing upon each other the disks of said series, said pressure plate being splined to the greater radius portion of the main hub and disposed in opposition to the stop means aforesaid, the pressure plate having its own hub projecting axially beyond the larger radius portion of said main hub, an annular piston having a radial ball-bearing positioning it with reference to said main hub, said piston including a tubular extension projecting along the lesser radius portion of the main hub telescopically into the pressure plate hub, a floating cylinder having an external wall encircling and having packed sliding bearing on the annular piston, said cylinder having an annular head portion encircling the said extension of said piston and in packed sliding bearing thereon, a thrust needle bearing interposed between said piston and said pressure plate and encircling the hub with which the pressure plate is provided, the bearing including needles which substantially correspond in radial position with said disks and with that part of said fixed piston which is outside of said ball-bearing, and means for introducing pressure fluid into the cylinder.

2. A clutch according to claim 1 in which the annular piston is fixed against rotation and the means for introducing pressure fluid into the cylinder comprises a tube generally radial with respect to the piston and communicating with an axial duct with which the piston is provided and which leads toward the cylinder, the cylinder being relieved radially about the end of the piston to receive pressure fluid communicated thereto through said duct, the piston having a generally radial portion connected with its said extension, and the said ball-bearing including an inner race on the lesser radius portion of the hub and an outer race within the said piston and abutting the radial portion thereof.

3. A clutch according to claim 1 and which is provided with means for using pressure fluid from the cylinder to lubricate the thrust needle bearing.

4. A clutch according to claim 3 in which said last mentioned means comprises an orifice with which the cylinder is provided and which opens through the cylinder toward the needle bearing.

5. A clutch according to claim 4 in which the piston has a pin projecting through said orifice and of less diameter than the cross section thereof for securing the cylinder against rotation and keeping the remaining said orifice cross section open by relative movement between the pin and the cylinder.

References Cited

UNITED STATES PATENTS

| 2,345,860 | 4/1944 | Iversen. | |
| 3,011,608 | 12/1961 | Hansen | 192—85 |
| 3,250,353 | 5/1966 | Liszewiski et al. | 192—85 X |
| 3,157,257 | 11/1964 | Root | 192—85 X |
| 2,055,970 | 9/1936 | Fippard | 192—85 X |
| 2,587,230 | 2/1952 | Schaad | 192—85 X |
| 3,148,144 | 9/1964 | Brenner et al. | 192—85 X |

FOREIGN PATENTS 213,165    9/1960  Austria.

BENJAMIN W. WYCKE III, *Primary Examiner.*

U.S. Cl. X.R.

192—113